United States Statutory Invention Registration [19]

[11] Reg. Number: H947

Bott

[43] Published: Aug. 6, 1991

[54] PACKAGING FOR EXPLOSIVE (ALCLO) PELLETS

[75] Inventor: John P. Bott, San Diego, Calif.

[73] Assignee: The United States of America as represented by the Secretary of the Navy, Washington, D.C.

[21] Appl. No.: 320,182

[22] Filed: Mar. 7, 1989

[51] Int. Cl.[5] ..... D23D 23/00

[52] U.S. Cl. ..... 44/541; 114/20.2; 237/18; 60/253

[58] Field of Search ..... 44/541; 114/20.2; 431/267; 60/253; 237/18

[56] References Cited

U.S. PATENT DOCUMENTS

| | | | |
|---|---|---|---|
| 2,834,661 | 10/1958 | Chaplin | 44/40 |
| 2,894,851 | 7/1959 | Booth et al. | 117/6 |
| 3,056,701 | 10/1962 | Fritzlen | 44/541 |
| 3,231,345 | 1/1966 | Wilder et al. | 44/7 |
| 3,849,069 | 11/1974 | Kaartinen | 23/253 PC |
| 3,964,416 | 6/1976 | Kiraly et al. | 114/20 A |
| 4,169,170 | 9/1979 | Doeksen | 427/155 |

*Primary Examiner*—Peter A. Nelson

*Attorney, Agent, or Firm*—Harvey Fendelman; Thomas Glenn Keough

[57] ABSTRACT

Tablets of aluminum and potassium perchlorate (ALCLO), used to ignite a preferred fuel in a closed cycle steam engine, are wrapped in aluminum foil to avoid the creation of powdered ALCLO. The prevention of powdering the ALCLO tablets reduces the possibility of inadvertent ignition from electrostatic discharge, ignition by mechanical or other means. Also, the creation of higher than intended burn rates is prevented when intentional ignition is initiated.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

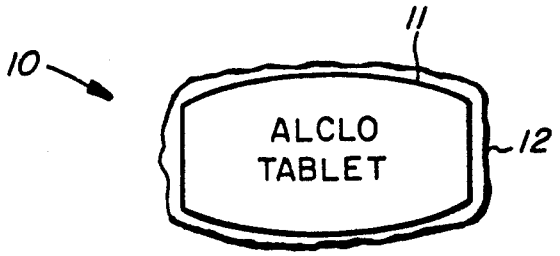
10
11
ALCLO
TABLET
12

PACKAGING FOR EXPLOSIVE (ALCLO) PELLETS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Closed cycle steam engines used for example in propelling underwater vehicles such as torpedos are many and varied in design. Typical of such a system is the steam boiler-reactor disclosed in U.S. Pat. No. 3,964,416. Elongate pyrotechnic starting charges extend through a fuel, in this case cast lithium, to initiate combustion and a consequent creation of steam. The elongate pyrotechnic starting charges consist of a mixture of finely divided aluminum and potassium perchlorate. Those who have worked with and are experianced with such mixtures have learned that the mixtures may be susceptible to becoming even more finely powdered and, therefore, more susceptible to the possibility of an unintentional ignition that may be due to electrostatic discharge,ignition by mechanical friction or other means. Another undesirable possibility is that when a planned ignition is initiated, the ignition might progress at a much higher, violent burn rate than is intended for a proper ignition of a preferred fuel.

In some later closed-cycle boiler designs the columns of ALCLO have been replaced by tablets which are placed in a cavity within the boiler. However, it has been noted that handling and the vibrating environment causes some settling to occur and the tablets rub against each other. This causes the generation of powdered ALCLO which is far easier to ignite than the pellet form so that the possibility, of an accidential ignition by electrostatic discharges ignition by mechanical friction or other means. Or a higher, explosive burn rate may result after an intentional ignition.

A combustion system disclosed in U.S. Pat. No. 3,056,701 uses aluminum foil to perform both mechanical and fuel functions. Aluminum foil disks separate powdered packages of fuel materials. Modifications of the disk use separate packages, like soup bags, to contain the powdered fuel materials. The powdered form of the fuel materials is retained to assure an intense and vigorous actuation for such uses as artillery rockets and the like. The powdered from of the fuel assures such a intense and vigorous burning which is encouraged for the intended use.

Thus, a continuing need exists in the state of the art for a method or means of preventing the inadvertent powderinq of explosive ALCLO tablets used in a torpedo boiler.

SUMMARY OF THE INVENTION

The present invention is directed to providing a packaging medium for explosive ALCLO tablets used in a torpedo boiler. Aluminum foil is wrapped around each pellet to completely surround each pellet. This prevents the direct rubbing of adjacent pellets together and cushions them to help minimize the effects of vibration and consequent creation of powder and also provides a means of protection against electrostatic discharge.

An object of the invention is to provide a means for preventing the powdering of ALCLO tablets while they are stored in a torpedo boiler.

Another object is to provide an aluminum foil wrapping for each ALCLO tablet that prevents the frictional abrasion of each tablet and consequent powder formation.

Another object is to provide an aluminum foil packaging medium for explosive ALCLO tablets that provides a means of protecting against electrostatic discharge.

Another object is to provide an aluminum foil packaging medium for explosive ALCLO tablets that provides cushioning to help minimize pellet damage that otherwise may be caused by ambient vibration.

Yet a further object is to provide an aluminum foil packaging medium for explosive ALCLO tablets which is a component of the explosive thereby introducing no foreign material that might have undesirable characteristics such as excessive boiler pressurization upon ignition or modification cf the pellet burn rate.

These and other objects of the invention will become more readily apparent from the ensuing description and the claims when taken with the appended drawings.

BRIEF DESCRIPTION OF THE DRAWING

The figure depicts: a representative embodiment of the invention.

DESCRIPTION OF THE PREFERRED EMBODIMENT

Referring now to the drawing, a packaging medium 10 is provided for preventing the powder formation of an ALCLO tablet 11. The tablet is wrapped in aluminum foil 1 which completely surrounds the tablet.

Wrapping the ALCLO tablet in aluminum foil is advantageous since it avoids the direct rubbing of the tablets together or against the walls of a containing structure and a consequent powder formation. The wrapping additionally provides some cushioning to help minimize tablet damage that& might be attributed to surrounding machinery, handling and other environmental vibrations. This compares favorably with merely coating the tablets with an aluminum compound solution that would later harden for such a coating would not provide the cushioning effect and would be expensive or difficult to manufacture.

A further advantage is that the aluminum foil wrapping provides a means of protecting against electrostatic discharge and as a consequence, reduces the possibility of inadvertent ignition. Furthermore, the aluminum foil wrapping helps provide a desirable packaging density and isolation of each tablet.

Since the aluminum material of the foil is a component of the explosive (ALCLO is aluminum and potassium perchlorate), no foreign material is introduced in a combustion chamber. Some foreign materials might introduce undesirable characteristics such as excessive boiler pressurization upon ignition or modification of the tablet burn rate and should be avoided if possible.

The foil wrapped tablets function as the start charges for a steam boiler-reactor much in the same manner as that disclosed in the U.S. Pat. No. 3,964,416. The foil wrapped tablets help provide for a more stable system and reduce the possibility of an undesirable higher burn rate upon intentional ignition than may be the case with the columns of ALCLO employed in the boilerreactor of the referred to patent.

The retention of the tablet form of the ALCLO is due to the individual wrapping of the tablets in aluminum. This form of the ALCLO maintains ignition at a controllable rate such that the preferred fuel for a torpedo boiler is actuated within controlled limits for responsive operation of the steam boilerreactor.

Obviously, many other modifications and variations of the present invention are possible in the light of the above teachings. It is therefore to be understood that within the scope of the appended claims the invention may be practiced otherwise than as specifically described.

What is claimed is:

1. A method of preventing the formation of powdered ALCLO from ALCLO tablets used for the controlled start of a preferred fuel for a steam boiler-reactor in an underwater vehicle such as a torpedo comprising:

wrapping each of the ALCLO tablets separately in aluminum foil to prevent direct rubbing with adjacent tablets and the wall of a structure containing the tablets and the consequent possibility of powder formation, the wrapping of each tablet is the separate containing thereof in aluminum to ensure that each aluminum wrapping functions as a component of ALCLO by introducing no foreign material which might have undesirable characteristics such as excessive boiler pressurization or burn rate modification and protecting against unintentional electrostatic discharge by the wrapping of each ALCLO tablet.

2. In a steam-boiler reactor having a starting charge for ignition of the preferred fuel, an improvement therefor is provided comprising:

ALCLO tablets used as the starting charges, each wrapped in aluminum foil to eliminate the formation of powdered ALCLO and to protect against electrostatic discharge or ignition from mechanical friction or other means.

* * * * *